(12) United States Patent
Richard

(10) Patent No.: US 12,275,154 B2
(45) Date of Patent: *Apr. 15, 2025

(54) ROBOTS AND METHODS FOR PROTECTING FRAGILE COMPONENTS THEREOF

(71) Applicant: Sanctuary Cognitive Systems Corporation, Vancouver (CA)

(72) Inventor: Connor Shannon Richard, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 285 days.

This patent is subject to a terminal disclaimer.

(21) Appl. No.: 17/985,215

(22) Filed: Nov. 11, 2022

(65) Prior Publication Data

US 2023/0150135 A1    May 18, 2023

Related U.S. Application Data

(60) Provisional application No. 63/278,817, filed on Nov. 12, 2021.

(51) Int. Cl.
*B25J 9/16*    (2006.01)
*B25J 13/08*    (2006.01)
(Continued)

(52) U.S. Cl.
CPC ............. *B25J 9/1674* (2013.01); *B25J 9/161* (2013.01); *B25J 9/1664* (2013.01); *B25J 13/08* (2013.01);
(Continued)

(58) Field of Classification Search
CPC ........ B25J 9/161; B25J 9/1664; B25J 9/1674; B25J 13/08; B25J 15/0009; B25J 15/0019;
(Continued)

(56) References Cited

U.S. PATENT DOCUMENTS 6,902,015 B2    6/2005    Furuta et al.
9,193,403 B2    11/2015    Yun et al.
(Continued)

FOREIGN PATENT DOCUMENTS

WO    2015169894 A1    11/2015
WO    2020060267 A1    3/2020

OTHER PUBLICATIONS

Liu, Dongdong, Yuhang Lin, and Vikram Kapila. "A rollover strategy for wrist damage reduction in a forward falling humanoid." 2021 IEEE International Conference on Mechatronics and Automation (ICMA). IEEE, 2021.*
(Continued)

*Primary Examiner* — Jason Holloway
*Assistant Examiner* — Blake A Wood
(74) *Attorney, Agent, or Firm* — Thomas Mahon

(57) ABSTRACT

The present disclosure relates to protecting fragile members of robots from damage during fall events. In response to detecting a fall event, a fragile member of a robot can be actuated to a defensive configuration to avoid or reduce damage. An actuatable protective member can be actuated to protect a fragile member to avoid or reduce damage to the fragile member. Actuatable protective members can be dedicated protective members, or can be other members of the robot which serve different functionality outside of a fall event but act as a protective member during a fall event.

15 Claims, 5 Drawing Sheets

(51) Int. Cl.
  *B25J 15/00* (2006.01)
  *B25J 15/02* (2006.01)
  *B25J 19/00* (2006.01)
  *B25J 19/02* (2006.01)
  *B62D 57/032* (2006.01)

(52) U.S. Cl.
  CPC ....... *B25J 15/0009* (2013.01); *B25J 15/0019* (2013.01); *B25J 15/024* (2013.01); *B25J 19/0075* (2013.01); *B25J 19/0091* (2013.01); *B25J 19/02* (2013.01); *B62D 57/032* (2013.01)

(58) Field of Classification Search
  CPC .. B25J 15/024; B25J 19/0075; B25J 19/0091; B25J 19/02; B25J 19/06; B62D 57/032
  See application file for complete search history.

(56) References Cited

U.S. PATENT DOCUMENTS

| | | | |
|---|---|---|---|
| 9,429,948 B2 | 8/2016 | Gouaillier | |
| 2012/0245735 A1* | 9/2012 | Lee | B62D 57/032 700/255 |
| 2013/0231822 A1* | 9/2013 | Gouaillier | G06F 11/30 901/1 |
| 2014/0288705 A1* | 9/2014 | Yun | B62D 57/032 700/246 |
| 2017/0043486 A1* | 2/2017 | Laville | B25J 15/103 |
| 2023/0014536 A1* | 1/2023 | Kamon | H02P 3/22 |

OTHER PUBLICATIONS

Li, Qingqing, et al. "A minimized falling damage method for humanoid robots." International Journal of Advanced Robotic Systems 14.5 (2017): 1729881417728016.*

Cui, Da, et al. "Human inspired fall arrest strategy for humanoid robots based on stiffness ellipsoid optimisation." Bioinspiration & biomimetics 16.5 (2021): 056014.*

Ha, Sehoon, and C. Karen Liu. "Multiple contact planning for minimizing damage of humanoid falls." 2015 IEEE/RSJ International Conference on Intelligent Robots and Systems (IROS). IEEE, 2015.*

Canadian Intellectual Property Office, International Search Report, PCT/CA2022/051670, Feb. 1, 2023.

* cited by examiner

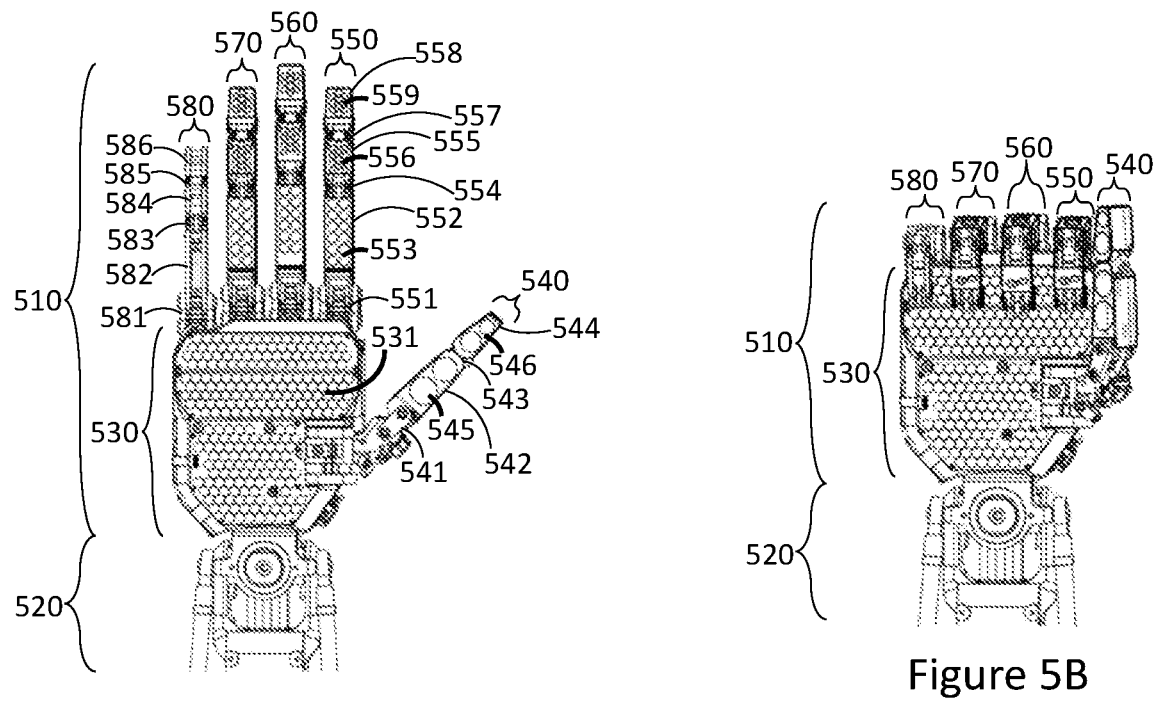
Figure 5A
Figure 5B
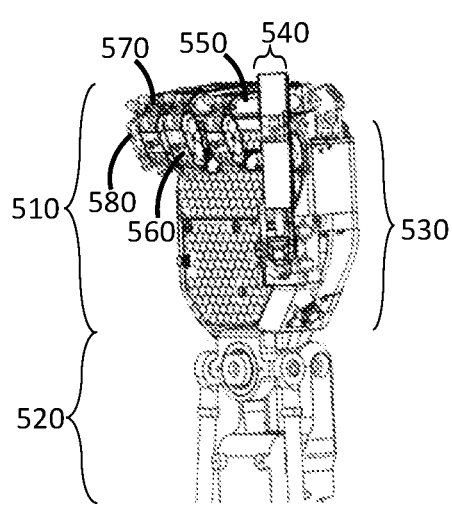
Figure 5C

ROBOTS AND METHODS FOR PROTECTING FRAGILE COMPONENTS THEREOF

TECHNICAL FIELD

The present robots and methods generally relate to fall events and particularly relate to protecting fragile members from damage during fall events.

BACKGROUND

Robots can be prone to falling. For example, robots can trip, lose balance, have control problems, or any number of issues that can result in the robot not being stable and falling towards the ground or other objects in an unintended way. Further, robots can be equipped with fragile members. For example, in order to interact with objects in the world, robots can have complicated, expensive, or easily damaged or breakable end effectors (e.g. hands). As another example, robots can have other complicated, expensive, or easily damaged or breakable features, such as aesthetic coatings, covers, masks, etc. A fall event can break, damage, scratch, chip, or otherwise harm such fragile members.

BRIEF SUMMARY

According to a broad aspect, the present disclosure describes a robot comprising: a body; a fragile member; at least one processor; at least one sensor communicatively coupled to the at least one processor; at least one non-transitory processor-readable storage medium communicatively coupled to the at least one processor, the at least one non-transitory processor-readable storage medium storing processor-executable instructions which, when executed by the at least one processor, cause the robot to: detect, by the at least one processor, a fall event of the body based on sensor data from the at least one sensor; in response to detecting the fall event, actuate at least one member of the robot to protect the fragile member.

The processor-executable instructions which, when executed by the at least one processor, cause the robot to actuate at least one member of the robot to protect the fragile member may cause the robot to: actuate the fragile member to a defensive configuration which protects the fragile member from damage during the fall event. The defensive configuration may be a contracted configuration. The fragile member may include an end effector comprising a plurality of finger-shaped members coupled to a palm-shaped member; and the defensive configuration may be a fist-shaped configuration. The fragile member may include a plurality of gripper-members; and the defensive configuration may be a configuration in which the gripper-members are closed together.

The robot may include at least one actuatable member; and the processor-executable instructions which, when executed by the at least one processor, cause the robot to actuate at least one member of the robot to protect the fragile member may cause the robot to: actuate the at least one actuatable member to a protective configuration which protects the fragile member from damage during the fall event. The at least one actuatable member may comprise at least one support member coupled to the body and stored in a contracted configuration; and the processor-executable instructions which, when executed by the at least one processor, cause the robot to actuate the at least one actuatable member to a protective configuration may cause the at least one actuatable member to extend from the body to an extended configuration which braces the body during the fall event. The at least one actuatable member may comprise at least one support member; and the processor-executable instructions which, when executed by the at least one processor, cause the robot to actuate the at least one actuatable member to a protective configuration may cause the at least one actuatable member to extend from a stowed configuration to a support configuration which braces the fragile member during the fall event. The fragile member may include a plurality of fragile members; the at least one actuatable member may include a plurality of actuatable members; and the processor-executable instructions which, when executed by the at least one processor, cause the robot to actuate the at least one actuatable member to a protective configuration which protects the fragile member from damage during the fall event may cause the robot to: actuate each actuatable member of the plurality of actuatable members to a respective protective configuration which protects a respective fragile member of the plurality of fragile members from damage during the fall event.

The robot may include at least one actuatable member; and the processor-executable instructions which, when executed by the at least one processor, cause the robot to actuate at least one member of the robot to protect the fragile member may cause the robot to: actuate the fragile member to a defensive configuration which protects the fragile member from damage during the fall event; and actuate the at least one actuatable member to a protective configuration which protects the fragile member from damage during the fall event. The defensive configuration may be a contracted configuration, and the protective configuration may be an extended configuration. The fragile member may comprise an end effector coupled to the body by the at least one actuatable member; the processor-executable instructions which, when executed by the at least one processor, cause the robot to actuate the fragile member to a defensive configuration may cause the robot to actuate the fragile member to move towards the body; and the processor-executable instructions which, when executed by the at least one processor, cause the robot to actuate the at least one actuatable member to a protective configuration may cause the robot to actuate the at least one actuatable member to extend away from the body. The fragile member may comprise a hand-shaped end effector; the at least one actuatable member may comprise an arm member including an elbow portion; the hand-shaped end effector may be coupled to the body by the arm member; the processor-executable instructions which, when executed by the at least one processor, cause the robot to actuate the fragile member to a defensive configuration may cause the robot to actuate the hand-shaped end effector to move towards the body; and the processor-executable instructions which, when executed by the at least one processor, cause the robot to actuate the at least one actuatable member to a protective configuration may cause the robot to actuate the arm member to extend the elbow portion away from the body. The hand-shaped member may include two hand-shaped members; and the at least one arm member may include two arm members. The robot may further comprise at least one support structure coupled to the at least one actuatable member which protects the at least one actuatable member from damage during the fall event. The at least one support structure may be selected from a group of structures consisting of: at least one pad; at least one pedestal; and at least one spring. The at least one actuatable member may comprise an arm member having an elbow portion; and the at least one support structure may comprise at least one elbow pad positioned at or proximate the elbow portion. The processor-executable instructions, when executed by the at least one processor, may further cause the robot to, in response to detecting the fall event: actuate the elbow pad to cover the elbow portion. The support structure may be actuatable between a stowed configuration in which the support structure is stowed, and a support configuration in which the support structure supports the at least one actuatable member; and the processor-executable instructions, when executed by the at least one processor, may further cause the robot to, in response to detecting the fall event, actuate the at least one support structure from the stowed configuration to the support configuration.

The at least one sensor may comprise at least one sensor selected from a group of sensors consisting of: an accelerometer; a gyroscope; an inertial measurement unit; a visual sensor; a LIDAR sensor; an audio sensor; and a tactile sensor.

The robot may further comprise two actuatable leg members. The two actuatable leg members may be actuatable to move the robot by bipedal motion. The at least one non-transitory processor-readable storage medium may store further instructions which, when executed by the at least one processor, cause the robot to: move by bipedal motion of the two actuatable leg members.

According to another broad aspect, the present disclosure describes a method comprising: detecting, by at least one processor of a robot, a fall event of a body of the robot based on sensor data from at least one sensor of the robot communicatively coupled to the at least one processor; in response to detecting the fall event, actuating at least one member of the robot to protect a fragile member of the robot.

Actuating at least one member of the robot to protect the fragile member may comprise: actuating the fragile member to a defensive configuration which protects the fragile member from damage during the fall event. Actuating the fragile member to a defensive configuration may comprise actuating the fragile member to a contracted configuration. The fragile member may include an end effector comprising a plurality of finger-shaped members coupled to a palm-shaped member; and actuating the fragile member to a defensive configuration may comprise actuating the finger-shaped members to move towards the palm-shaped member to a fist-shaped configuration. The fragile member may include a plurality of gripper-members; and actuating the fragile member to a defensive configuration may comprise actuating the gripper members to close together.

The robot may include at least one actuatable member; and actuating at least one member of the robot to protect the fragile member may comprise: actuating the at least one actuatable member to a protective configuration which protects the fragile member from damage during the fall event. The at least one actuatable member may comprise at least one support member coupled to the body and stored in a contracted configuration; and actuating the at least one actuatable member to a protective configuration may comprise: extending the at least one actuatable member from the body to an extended configuration which braces the body during the fall event. The at least one actuatable member may comprise at least one support member; and actuating the at least one actuatable member to a protective configuration may comprise extending the at least one support member from a stowed configuration to a support configuration which braces the fragile member during the fall event. The fragile member may include a plurality of fragile members; the at least one actuatable member may include a plurality of actuatable members; and actuating the at least one actuatable member to a protective configuration which protects the fragile member from damage during the fall event may comprise: actuating each actuatable member of the plurality of actuatable members to a respective protective configuration which protects a respective fragile member of the plurality of fragile members from damage during the fall event.

The robot may include at least one actuatable member; and actuating at least one member of the robot to protect the fragile member may comprise: actuating the fragile member to a defensive configuration which protects the fragile member from damage during the fall event; and actuating the at least one actuatable member to a protective configuration which protects the fragile member from damage during the fall event. Actuating the fragile member to a defensive configuration may comprise actuating the fragile member to a contracted configuration, and actuating the at least one actuatable member to a protective configuration may comprise actuating the at least one actuatable member to an extended configuration. The fragile member may comprise an end effector coupled to the body by the at least one actuatable member; actuating the fragile member to a defensive configuration may comprise actuating the fragile member to move towards the body; and actuating the at least one actuatable member to a protective configuration may comprise actuating the at least one actuatable member to extend away from the body. The fragile member may comprise a hand-shaped end effector; the at least one actuatable member may comprise an arm member including an elbow portion; the hand-shaped end effector may be coupled to the body by the arm member; actuating the fragile member to a defensive configuration may comprise actuating the hand-shaped end effector to move towards the body; and actuating the at least one actuatable member to a protective configuration may comprise actuating the arm member to extend the elbow portion away from the body. The fragile member may comprise two hand-shaped end effectors; the at least one actuatable member may comprise two arm members, each arm member including a respective elbow portion; each hand-shaped end effector may be coupled to the body by a respective one of the arm members; actuating the fragile member to a defensive configuration may comprise actuating each of the hand-shaped end effectors to move towards the body; and actuating the at least one actuatable member to a protective configuration may comprise actuating each of the arm members to extend each respective elbow portion away from the body. The robot may include at least one support structure coupled to the at least one actuatable member, the support structure may be actuatable between a stowed configuration in which the support structure is stowed, and a support configuration in which the support structure supports the at least one actuatable member; and the method may further comprise, in response to detecting the fall event, actuating the at least one support structure from the stowed configuration to the support configuration. The at least one support structure may comprise at least one pad positioned at or proximate the at least one actuatable member; and the method may further comprise, in response to detecting the fall event, actuating the pad to cover the at least one actuatable member. The at least one actuatable member may comprise an arm member having an elbow portion; the at least one support structure may comprise at least one elbow pad positioned at or proximate the elbow portion; and actuating the at least one support structure from the stowed configuration to the support configuration may comprise actuating the elbow pad to cover the elbow portion. The at least one support structure may comprise at least one pedestal positioned at the at least one actuatable member; and actuating the at least one support structure from the stowed configuration to the support configuration may comprise actuating the pedestal to extend from the at least one actuatable member. The at least one support structure may comprise at least one spring positioned at the at least one actuatable member; and actuating the at least one support structure from the stowed configuration to the support configuration may comprise actuating the spring to extend from the at least one actuatable member.

The method may further comprise collecting, by the at least one sensor, sensor data selected from a group of data consisting of: acceleration data; orientation data; angular velocity data; velocity data; inertial data; visual data; LIDAR data; audio data; and tactile data. The method may further comprise moving the robot in bipedal motion, by two actuatable leg members of the robot.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

FIGS. 5A and 5B are side views of another exemplary end effector coupled to a member of a robot. FIG. 5C is an isometric view of the end effector shown in FIGS. 5A and 5B.

DETAILED DESCRIPTION

The following description sets forth specific details in order to illustrate and provide an understanding of the various implementations and embodiments of the present robots and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present robots and methods.

The various embodiments described herein provide robots and methods for protecting fragile members from damage during fall events. Generally, "fragile member" refers to a member which is easily damaged or broken (relative to other members of a robot). However, in the context of this disclosure, "fragile member" can also refer to a member which is problematic if broken or damaged, even if said fragile member is not more easily damaged or broken relative to certain other members of a robot. This could be for example because the member could be expensive, difficult or time consuming to manufacture, difficult or time consuming to replace/repair, or usability of the robot could be significantly impaired due to the damage, as non-limiting examples. Alternative terms for "fragile member" could include "susceptible member", "vulnerable member", "breakable member", "precious member", "important member", or any other appropriate term which conveys the relative importance or susceptibility to damage of the member. Several exemplary fragile members are discussed throughout this disclosure.

Figure 1:
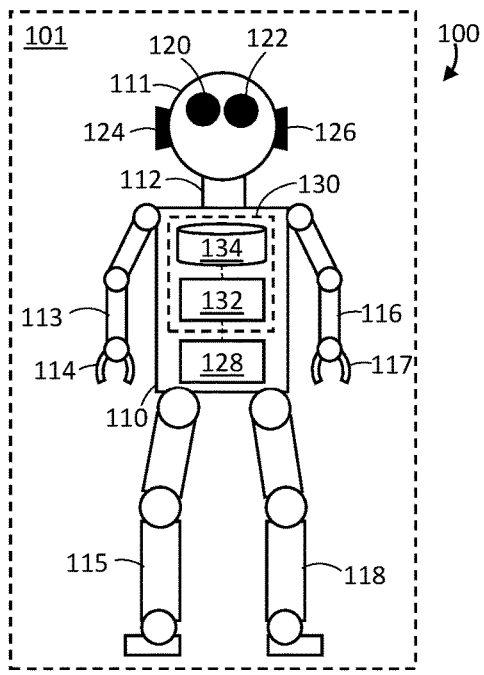
FIG. 1 is a front view of a robot which may experience a fall event.

FIG. 1 is a front view of an exemplary robot 100 in accordance with one implementation. In the illustrated example, robot 100 includes a body 101 that is designed to approximate human anatomy, including a torso 110 coupled to a plurality of members including head 111 (via neck 112), right arm 113 (in turn coupled to end effector 114), right leg 115, left arm 116 (in turn coupled to end effector 117), and left leg 118, which approximate anatomical features. More or fewer anatomical features could be included as appropriate for a given application. Further, how closely a robot approximates human anatomy can also be selected as appropriate for a given application. In some applications, a robot body may only approximate a portion of human anatomy. As non-limiting examples, only an arm of human anatomy, only a head or face of human anatomy; or only a leg of human anatomy could be approximated. In some applications, a robot may not approximate human anatomy at all.

Members 110, 111, 112, 113, 114, 115, 116, 117, and/or 118 can be actuatable relative to other components. Actuators, motors, or other movement devices can couple together actuatable members. Driving said actuators, motors, or other movement driving mechanism causes actuation of the actuatable members. For example, rigid limbs in a humanoid robot can be coupled by motorized joints, where actuation of the rigid limbs is achieved by driving movement in the motorized joints. In some implementations, such actuators, motors, or other movement driving mechanisms can be included in corresponding actuatable members. It is not required that each of components 110, 111, 112, 113, 114, 115, 116, 117, and/or 118 be actuatable; some of these components can be non-actuatable. As one example, head 111 could be rigidly coupled to torso 110 by a rigid neck 112. It is also possible that any or all of components 110, 111, 112, 113, 114, 115, 116, 117, and/or 118 be actuatable. As one example, head 111 could be actuated by actuation of neck 112. Further any of the members can include sub-members, and said sub-members can be actuatable. As one example, head 111 could include sub-members such as eyebrows, eyes, lips, or any other appropriate sub-members, which can be actuated (e.g. to emulate human emotions).

Robot 100 is also illustrated as including sensors 120, 122, 124, 126, and 128, which collect sensor data. In the example, sensors 120 and 122 are image sensors (e.g. cameras) that capture visual data. LIDAR sensors which capture LIDAR data could also be used. Sensors 124 and 126 are audio sensors (e.g. microphones) that capture audio data. Sensor 128 can include at least one motion or orientation sensor, such as an accelerometer, a gyroscope, an inertial measurement unit, a compass, or a magnetometer. Such sensors could capture, for example, acceleration data, orientation data, angular velocity data, velocity data, inertial data, or any other appropriate type of data. Although not illustrated, robot 100 could also include a tactile sensor, which captures tactile data. Many types of sensors are illustrated and discussed with reference to the example of FIG. 1, but more or fewer sensor types could be included as appropriate for a given application. As examples, only one of the exemplary sensor types could be included, a subset of the exemplary sensor types could be included, all of the exemplary sensor types could be included, or even more sensor types than those discussed could be included. Further, any appropriate number of sensors of a given sensor type could be included. As examples, only one sensor of a given type could be included, or a plurality of sensors of a given type could be included. Any combination of sensor types and number of sensors of each type could be included as appropriate for a given application. Further, although sensors 120 and 122 are shown as approximating human eyes, and sensors 124 and 126 are shown as approximating human ears, sensors 120, 122, 124, and 126 could be positioned in any appropriate locations.

Robot 100 is also illustrated as including at least one processor 132, communicatively coupled to at least one non-transitory processor-readable storage medium 134. The at least one processor 132 can control actuation of members 110, 111, 112, 113, 114, 115, 116, 117, and 118; can receive and process data from sensors 120, 122, 124, 126 and 128; and can perform fall detection as discussed later with reference to FIG. 2. The at least one non-transitory processor-readable storage medium 134 can have processor-executable instructions stored thereon, which when executed by the at least one processor 132 can cause robot 100 to perform any of the methods discussed herein (e.g. method 200 in FIG. 2). Further, the at least one non-transitory processor-readable storage medium 134 can store sensor data or any other data as appropriate for a given application. The at least one processor 132 and the at least one processor-readable storage medium 134 together can be considered as components of a "robot controller" 130, in that they control operation of robot 100 in some capacity. While the at least one processor 132 and the at least one processor-readable storage medium 134 can perform all of the respective functions described in this paragraph, this is not necessarily the case, and the "robot controller" 130 can be remote from body 101, or further include components that are remote from body 101.

In emulating human anatomy, it can be helpful or desirable for a robot to not only emulate physical features of human anatomy, but to also emulate how a human moves. For example, bipedal motion (a form of locomotion where movement occurs by means of two legs) can be emulated. This makes a robot (such as robot 100) resemble a human more closely aesthetically, and also better enables the robot to conduct itself in human environments. In particular, human environments are typically designed and constructed in ways that are conducive to human anatomy (such as in ways that are suited to bipedal motion). Examples of this include stairs or ladders, as non-limiting examples, which are challenging for other forms of locomotion like wheels. Additionally, even if not specifically designed by and constructed for humans, it can be desirable for a robot to be operable in environments which humans operate in, including flat terrain, hilly terrain, rocky terrain, mountainous terrain, or terrain with obstacles, as non-limiting examples— all of which are traversable by bipedal walking.

To this end, robot 100 as shown in FIG. 1 includes two actuatable leg members: right leg member 115 and left leg member 118. Leg members 115 and 118 are actuatable to move robot 100 by bipedal motion. That is, leg members 115 and 118 can alternately apply force to a ground surface to move robot 100 in a desired direction. In some implementations, control of leg members 115 and 118 can be provided by a tele-operation system, where an operator equips motion sensors to themselves (such as leg motion sensors, through additional sensors could also be equipped, such as a body motion sensing suit), and performs bipedal motion. The bipedal motion is sensed by the motion sensors and emulated by the robot 100. In other implementations (such as after an control system of robot 100 has been trained in bipedal motion), the at least one non-transitory processor-readable storage medium 134 of robot 100 stores instructions, at least one control paradigm, or other form of control data, which when executed by the at least one processor 132 causes robot 100 to move by bipedal motion of the actuatable leg members 115 and 118. Further, methods of operation of a robot such as robot 100 can comprise moving the robot in bipedal motion, by two actuatable leg members of the robot (actuatable leg members 115 and 118 in robot 100).

However, bipedal motion is difficult to emulate, and can increase the likelihood that a robot will lose balance and experience a fall event. Conventionally, when a bipedal human experiences a fall event, the human will extend their hands and try to catch themselves by falling on their hands. In implementations of the present systems, devices, and methods in which the robot's hands are fragile members, it is desirable to avoid this instinctive "catch/absorb a fall with the hands" behavior. Thus, while it can be advantageous to enable a robot to emulate human function and behavior by designing and operating a robot to achieve bipedal walking, in accordance with the present systems, devices, and methods a bipedal robot may be purposefully designed and operated away from the conventional "catch/absorb a fall with the hands" behavior that is inherent in other bipedal systems (such as humans) and after which a bipedal robot may otherwise be modeled. Instead, a bipedal robot may be designed and operated to protect its hands (and/or other fragile member(s)) when it falls by, for example, curling the hands into a protected configuration, directing its elbows (or support structure) towards the fall, and catching/absorbing the fall with its elbows (or support structure) as described in more detail herein.

Figure 2:
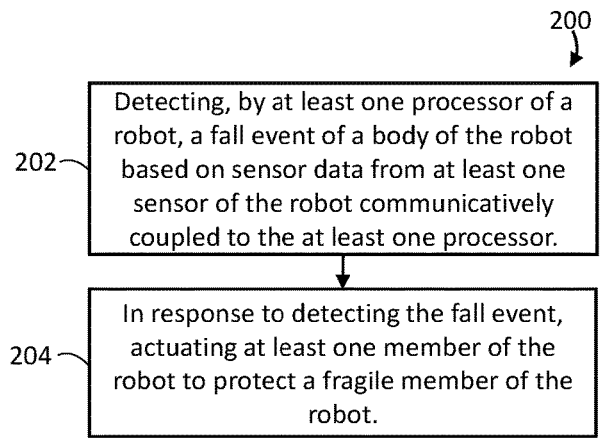
FIG. 2 is a flowchart diagram of an exemplary method for operating a robot.

FIG. 2 is a flowchart diagram showing an exemplary method 200 of operation of a robot in accordance with the present systems, devices, and methods. Method 200 as illustrated includes acts 202 and 204, though those of skill in the art will appreciate that in alternative implementations certain acts may be omitted and/or additional acts may be added. In some implementations, method 200 can be performed by robot 100 discussed with reference to FIG. 1. Discussion of method 200 below references elements of robot 100 for convenience, but method 200 can be performed by any appropriate robot having at least one processor, a body, at least one sensor, and a fragile member. Further, at least one processor-readable storage medium (such as the at least one non-transitory processor-readable storage medium 134) can store processor-executable instructions that, when executed by at the at least one processor (such as the at least one processor 132), cause the robot to perform the method 200.

At act 202, the at least one processor 132 detects a fall event of body 101 of robot 100, based on sensor data from at least one sensor communicatively coupled to the at least one processor 132 (e.g. any of sensors 120, 122, 124, 126, or 128). As one example, if the at least one sensor includes a visual sensor, the at least one processor 132 could detect a fall event based on a sudden shift in captured visual data (from the visual sensor experiencing movement of the fall event). As another example, if the sensor includes a LIDAR sensor, the at least one processor 132 could detect a fall event based on a sudden shift in captured LIDAR data (from the LIDAR sensor experiencing movement of the fall event). As another example, if the at least one sensor includes an accelerometer, the at least one processor 132 could detect a fall event based on acceleration of body 101 (e.g. sudden acceleration of body 101 downwards). As yet another example, if the at least one sensor includes a gyroscope, compass, or magnetometer, the at least one processor 132 could detect a change in orientation of the body 101 (e.g. body 101 tipping over). As yet another example, if the at least one sensor includes an inertial measurement unit, the at least one processor 132 could detect an inertial change of body 101, such as acceleration or angular acceleration (such as sudden acceleration or rotation of body 101). As yet another example, if the at least one sensor includes an audio sensor, the at least one processor 132 could detect a sound of air on a microphone, or a sound of clattering robot parts (sounds of body 101 falling). As yet another example, if the at least one sensor includes a velocity sensor, the at least one processor can detect sudden changes in velocity (body 101 experiencing motion of the fall event). As yet another example, if the at least one sensor includes a tactile sensor, the at least one processor 132 could detect impact against body 101 (e.g. from at least one member of body 101 colliding against each other or against another object during the fall event). In some implementations, sensor data from a plurality of sensors can be captured and processed, such that different types of sensor data can be synthesized or processed, to accurately detect fall events and minimize occurrence of false positive detections or false negative errors.

At act 204, in response to detecting the fall event, at least one member of the robot is actuated to protect a fragile member of the robot. In some implementations, the fragile member itself can be actuated to a defensive configuration to protect the fragile member from damage during the fall event, as discussed later with reference to FIGS. 3A, 3B, 3C, 4A, 4B, 5A, 5B, and 5C, as examples. In other implementations, an actuatable member is actuated to a protective configuration to protect the fragile member from damage during the fall event, as discussed later with reference to FIGS. 6A, 6B, 7A, 7B, 8A, 8B, 9A, 9B, 10B, 10C, and 10D, as examples. In some implementations, the fragile member itself is actuated to a defensive configuration and an actuatable member is actuated to a protective configuration to protect the fragile member from damage during the fall event, as discussed with reference to FIGS. 10B, 10D, and 10E, as examples.

As mentioned above, in some implementations, actuating at least one member of the robot to protect the fragile member as in act 204 of method 200 in FIG. 2 comprises actuating the fragile member to a defensive configuration to protect the fragile member from damage during the fall event. In some exemplary implementations, the fragile member can be actuated to a contracted or closed configuration. Several examples are discussed below with reference to FIGS. 3A, 3B, 3C, 4A, 4B, 5A, 5B, and 5C.

Figure 3A:
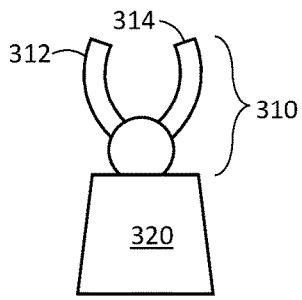
FIGS. 3A, 3B, and 3C are side views of an exemplary end effector coupled to a member of a robot.
Figure 3B:
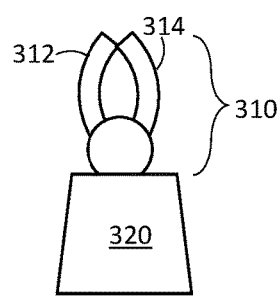
Figure 3C:
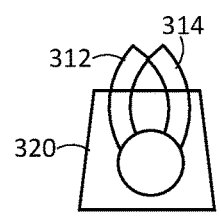

FIGS. 3A, 3B, and 3C are side views of an exemplary end effector 310 coupled to a member 320 of a robot. Member 320 could be, for example, an arm of robot 100 in FIG. 1. In the illustrated example, end effector 310 comprises a pair of grippers 312 and 314, which are operable to open and close relative to each other, to grip or release objects therebetween. In other implementations, additional grippers could be included, as appropriate. Due to their complicated mechanical nature, and relatively small components (compared to other parts of a robot), end effectors can be more easily broken or damaged than other components of a robot, and can be more expensive to manufacture and replace than other components of a robot. In this sense, end effectors can be "fragile members" or a robot. In the example, gripper members 312 and 314 are thinner (made of less material) than member 320, and can include delicate actuation hardware. Thus, in the example of FIGS. 3A, 3B, and 3C, end effector 310 is a "fragile member".

FIG. 3A illustrates end effector 310 in an open configuration, with gripper members 312 and 314 spaced apart from each other, to receive an object therebetween. FIG. 3B illustrates end effector 310 in a closed configuration, with gripper members 312 and 314 touching each other. While the closed configuration is useful to grip objects, the closed configuration is also useful as a defensive configuration to protect end effector 310 from damage during a fall event. In particular, actuating the fragile member to a defensive configuration as in act 204 of method 200 in FIG. 2 may comprise actuating gripper members 312 and 314 to close together. In this way, the strength of individual gripper members 312 and 314 reinforce each other, such that end effector 310 is more robust against impact that may occur during a fall event. The closed configuration of FIG. 3B can also be called a contracted configuration, in that gripper members 312 and 314 are "contracted" inward relative to each other.

FIG. 3C illustrates another contracted configuration, where end effector 310 is contracted into a recess in member 320. In this way, end effector 310 is protected by member 320 during a fall event. In FIG. 3C, end effector 310 is shown as being partially contracted in member 320 (i.e. gripper members 312 and 314 are shown as partially protruding from member 320), but in some implementations, end effector 310 can be fully contracted into member 320, such that end effector 310 is fully protected by member 320.

Figure 4A:
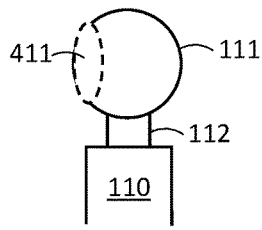
FIGS. 4A and 4B are side views of an exemplary head, neck, and torso of a robot.
Figure 4B:
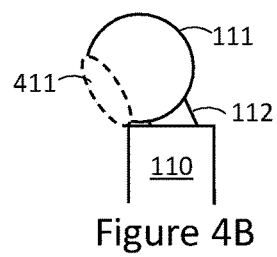

FIGS. 4A and 4B are side views of torso 110, head 111, and neck 112 as discussed with reference to robot 100 in FIG. 1. In the example illustrated in FIGS. 4A and 4B, head 111 has a face 411. Face 411 could comprise, as non-limiting examples: complex mechanical components like eyes, eyebrows, lips, or other facial features which approximate human anatomy; sensors like visual sensors, or other sensor types; aesthetic design features like masks or surface textures; or any other appropriate elements. Due to the presence of such components or elements, face 411 can be a "fragile member", in that elements of the face 411 can be easily broken or damaged, or expensive or difficult to replace. Even in cases whether elements of face 411 themselves aren't easily broken, even minor damage to face 411 can have dramatic consequences, since the face is an important aesthetic element, which robots can use to emulate human anatomy. Even small scratches or dents in face 411 can be problematic.

FIG. 4A illustrates head 111 in an erect configuration (i.e. held straight up, similar to in human anatomy). FIG. 4B illustrates head 111 in bent-over configuration. The bent-over configuration of FIG. 4B can be valuable as a defensive configuration, in that face 411 is less likely to be subjected to impact during a fall event if head 111 is in the bent-over configuration. As such, actuating the fragile member to a defensive configuration as in act 204 of method 200 in FIG. 2 may comprise actuating head 111 to bend forward (toward torso 110). The bent-over configuration of FIG. 4B can also be called a contracted configuration, in that the head 111 is contracted towards the torso 110.

FIGS. 5A, 5B, and 5C illustrate an exemplary end effector 510 coupled to a member 520 of a robot. Member 520 could be, for example, an arm of robot 100 in FIG. 1. In the illustrated example, end effector 510 is hand-shaped, to grip or release objects similar to how a human hand would. In the illustrated example, end effector 510 includes finger-shaped members 540, 550, 560, 570, and 580. Although five finger-shaped members are illustrated, any number of finger-shaped members could be included as appropriate for a given application. Each of finger-shaped members 540, 550, 560, 570, and 580 are coupled to a palm-shaped member 530. Palm-shaped member 530 serves as a common member to which the finger-shaped members are coupled. In the example, each of finger-shaped members 540, 550, 560, 570, and 580 are actuatable relative to the palm-shaped member 530. In particular, member 540 is actuatable relative to member 530 at joint 541; member 550 is actuatable relative to member 530 at joint 551; and member 580 is actuatable relative to member 530 at joint 581. Members 560 and 570 are similarly actuatable relative to member 530 at respective joints, but these joints are not labelled to avoid clutter. Finger-shaped members can also include joints at which sub-members of a given finger-shaped member are actuatable. In the illustrated example, finger-shaped member 540 includes sub-member 542 and sub-member 544, actuatable relative to each other about joint 543. Similarly, finger-shaped member 550 includes sub-members 552, 555, and 558, actuatable relative to each other about joints 554 and 557. Similarly, finger-shaped member 580 includes sub-members 582, 584, and 586, actuatable relative to each other about joints 583 and 585. Finger-shaped members 560 and 570 include similar sub-members and joints, but they are not labelled to avoid clutter. A finger-shaped member can include any number of sub-members and joints, as appropriate for a given application.

Due to their complicated mechanical nature, and relatively small components (compared to other parts of a robot), end effectors can be more easily broken or damaged than other components of a robot, and can be more expensive to manufacture and replace than other components of a robot. For example, joints 541, 543, 551, 554, 557, 581, 583, and 585 may be designed for motion of finger-shaped members and sub-members towards the palm-shaped member 530 (as illustrated in FIG. 5B discussed below), but may not be designed for extensive motion in the opposite direction. Motion in an unintended direction, such as may be caused by force due to a fall event, may break or damage finger-shaped members, joints, or sub-members. As another example, finger-shaped members, sub-members, and joints may be made thinner (made of less material) than member 520, and can include delicate actuation hardware. In this sense, any components of an end effector, such as the finger shaped members, sub-members, or joints discussed with reference to FIGS. 5A, 5B, and 5C can be "fragile members" or a robot. Additionally, FIGS. 5A, 5B, and 5C illustrate a plurality of optional sensor pads 531, 545, 546, 553, 556, and 559, and similar sensor pads on finger-shaped members 560 and 570 which are not labelled to avoid clutter. Finger-shaped member 580 is illustrated without sensor pads thereon, which is indicative that in some implementations a hand-shaped member may be only partially covered by sensor pads (although full cover by sensor pads is possible in other implementations). Such sensor pads can collect sensor data, such as tactile data or temperature data. Such sensor pads can also be prone to breaking or damage during a fall event, and thus can also be considered as "fragile members" of a robot.

FIG. 5A is a front-view which illustrates end effector 510 in an open configuration, with finger-shaped members 540, 550, 560, 570, and 580 extended from palm-shaped member 530, to receive an object. FIG. 5B is a front view which illustrates end effector 510 in a closed configuration, with finger-shaped members 540, 550, 560, 570, and 580 closed into palm-shaped member 530. FIG. 5C is an isometric view which illustrates end effector 510 in the closed configuration as in FIG. 5B. Each of the sub-members and sensor pads are not labelled in FIGS. 5B and 5C to avoid clutter. While the closed configuration is useful to grip objects, the closed configuration is also useful as a defensive configuration to protect end effector 510 from damage during a fall event. In particular, actuating the fragile member to a defensive configuration as in act 204 of method 200 in FIG. 2 may comprise actuating finger-shaped members 540, 550, 560, 570, and 580 to close toward palm-shaped member 530 in the closed configuration. In this way, the strength of individual finger-shaped members 540, 550, 560, 570, and 580 reinforce each other, such that end effector 510 is more robust against impact that may occur during a fall event. Further, finger-shaped members 540, 550, 560, 570, and 580 are also in a position where it is less likely that joints will be forced to bend in an unintended direction. The closed configuration of FIG. 5B can also be called a contracted configuration, in that finger-shaped members 540, 550, 560, 570, and 580 are "contracted" inward relative to each other.

The closed configuration can also be referred to as a fist-shaped configuration, due to resemblance to a human fist.

Further, the closed configuration of FIGS. 5B and 5C can also be considered as a protective configuration. In particular, in the closed configuration, finger-shaped members 540, 550, 560, 570, and 580 at least partially protect sensor pads 531, 545, 546, 553, 556, 559, and other unlabeled sensor pads from impact during a fall event.

As mentioned above, in some implementations, the robot comprises an actuatable member (in addition to the fragile member), and actuating at least one member of the robot to protect the fragile member as in act 204 of method 200 in FIG. 2 comprises actuating the actuatable member to a protective configuration which protects the fragile member from damage during the fall event. Several examples are discussed below with reference to FIGS. 6A, 6B, 7A, 7B, 8A, 8B, 9A, and 9B.

Figure 6A:
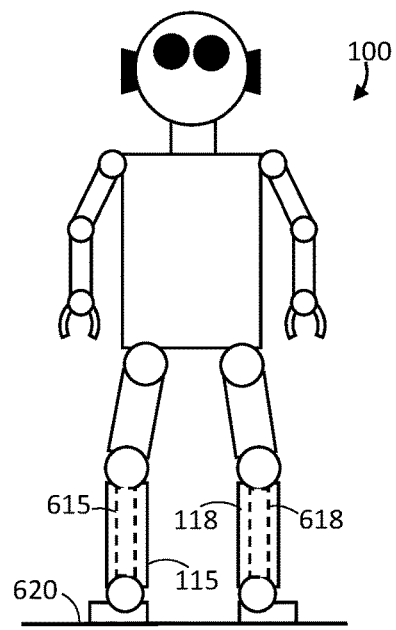
FIGS. 6A and 6B are front views of a robot having an actuatable support member.
Figure 6B:
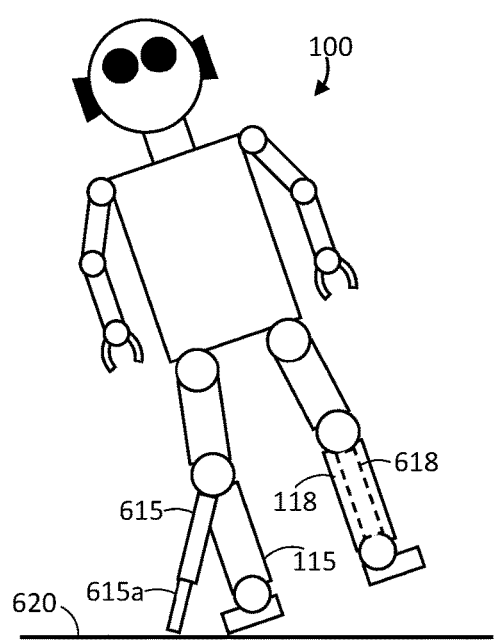

FIGS. 6A and 6B are front views of robot 100 as discussed with reference to FIG. 1. Not all features of robot 100 as illustrated in FIG. 1 are labelled in FIGS. 6A and 6B, to avoid clutter. Nonetheless, the description of robot 100 with reference to FIG. 1 is fully applicable to FIGS. 6A and 6B. Further, in FIGS. 6A and 6B, robot 100 includes an actuatable support member 615 coupled to right leg 115, and an actuatable support member 618 coupled to left leg 118. Support members 615 and 618 can each be in a contracted configuration as shown in FIG. 6A. In FIG. 6A, robot 100 is shown as standing on surface 620. In the example of FIG. 6B, robot 100 experiences a fall event. In response to the fall event, actuating the at least one actuatable member (support member 615) to a protective configuration comprises extending support member 615 from the body of robot 100 (from leg 115) to an extended configuration which braces the body of robot 100 against surface 620. This can prevent robot 100 from falling over, or at least redirect the fall of robot 100, so as to protect a fragile member or fragile members of robot 100.

In the example of FIG. 6B, support member 615 is shown as extending away from leg 115, and having an extension member 615a extending therefrom. However, the illustrated structure of support member 615 is merely exemplary, and any appropriate structure could be implementations as appropriate for a given application. As one example, a support member may only extend from the body of robot 100 and not include extension member 615a. As another example, a support member could include even more extension members, so as to increase surface area with which the support member braces the body of robot 100.

The contracted configuration of support member 615 discussed above and shown in FIG. 6A can also be referred to as a stowed configuration or a compact configuration, as examples. The extended configuration of support member 615 discussed above and shown in FIG. 6B can also be referred to as a support configuration or brace configuration, as examples. Further, description of support member 615 is fully applicable to support member 618. Support member 615 could be coupled to an exterior of leg 115, or could be positioned within a recess in leg 115 when in the contracted configuration. Similarly, support member 618 could be coupled to an exterior of leg 118, or could be positioned within a recess in leg 118 when in the contracted configuration. In some implementations, actuation of support member 615 or 618 could be selectively performed based on a direction which robot 100 falls during a fall event. In the example of FIG. 6B, robot 100 falls to the robot's right, and support member 615 extends to the right to support robot 100. In a scenario where robot 100 falls to the robot's left, support member 618 could extend to the left to support robot 100. Support members 615 and 618 could also be designed to extend forward and/or backward, to support robot 100 during forward falls and backwards falls.

Figure 7A:
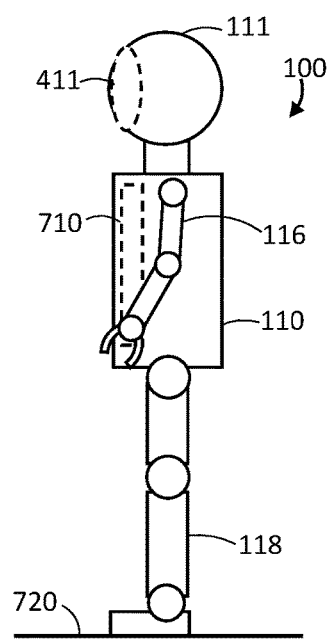
FIGS. 7A and 7B are side views of another robot having an actuatable support member.
Figure 7B:
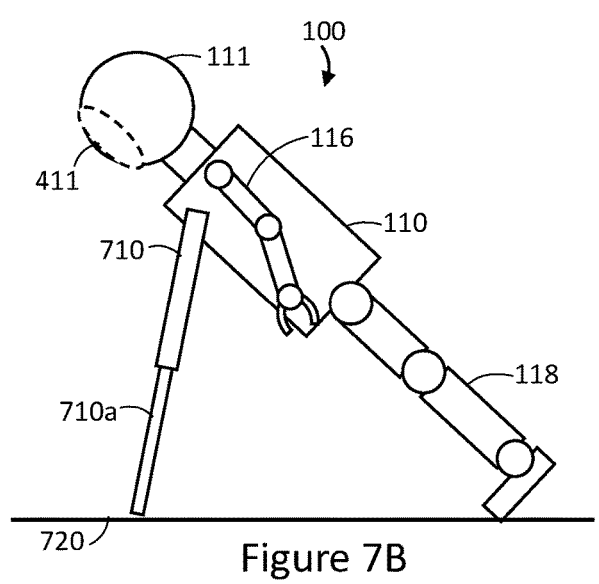

FIGS. 7A and 7B are side views of robot 100 as discussed with reference to FIG. 1. Not all features of robot 100 as illustrated in FIG. 1 are labelled in FIGS. 7A and 7B, to avoid clutter. Nonetheless, the description of robot 100 with reference to FIG. 1 is fully applicable to FIGS. 7A and 7B. Further, in FIGS. 7A and 7B, robot 100 includes an actuatable support member 710 coupled to torso 110. Support member 710 can be in a contracted configuration as shown in FIG. 7A. In FIG. 7A, robot 100 is shown as standing on a surface 720. In the example of FIG. 7B, robot 100 experiences a fall event. In response to the fall event, actuating the at least one actuatable member (support member 710) to a protective configuration comprises extending support member 710 from the body of robot 100 (from torso 110) to an extended configuration which braces the body of robot 100 against surface 720. This can prevent robot 100 from falling over, or at least redirect the fall of robot 100, so as to protect a fragile member or fragile members of robot 100. In the example, such fragile members could include at least one end effector (such as an end effector coupled to arm 116) or face 411 (similarly to as described with reference to FIGS. 4A and 4B).

In the example of FIG. 7B, support member 710 is shown as extending away from torso 110, and having an extension member 710a extending therefrom. However, the illustrated structure of support member 710 is merely exemplary, and any appropriate structure could be implemented as appropriate for a given application. As one example, a support member may only extend from the body of robot 100 and not include extension member 710a. As another example, a support member could include even more extension members, so as to increase surface area with which the support member braces the body of robot 100.

The contracted configuration of support member 710 discussed above and shown in FIG. 7A can also be referred to as a stowed configuration or a compact configuration, as examples. The extended configuration of support member 710 discussed above and shown in FIG. 7B can also be referred to as a support configuration or brace configuration, as examples. Support member 710 could be coupled to an exterior of torso 110, or could be positioned within a recess in torso 110 when in the contracted configuration. Additional support members could be included as needed to brace the robot 100 during fall events of different directions.

Figure 8A:
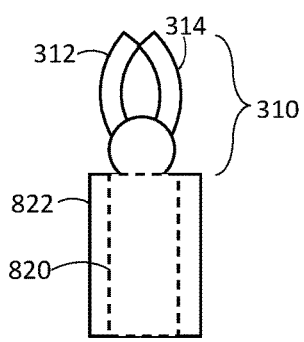
FIGS. 8A and 8B are side views of an exemplary end effector and a corresponding support member.
Figure 8B:
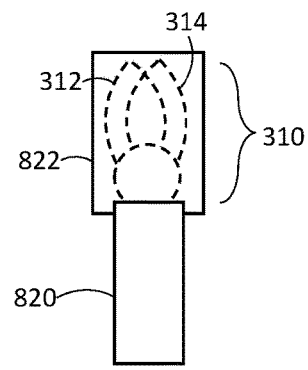

FIGS. 8A and 8B are side views of an exemplary end effector 310 coupled to a member 820 of a robot. End effector 310 as illustrated is similar to as described with reference to FIGS. 3A, 3B, and 3C, and is illustrated as including gripper members 312 and 314. Member 820 as illustrated is similar to member 320 discussed with reference to FIGS. 3A, 3B, and 3C, and can be for example an arm of a robot. One difference between member 820 in FIGS. 8A and 8B, and member 320 in FIGS. 3A, 3B, and 3C, is that member 820 has a support member 822 coupled thereto. Support member 822 is actuatable relative to member 820. In FIG. 8A, support member 822 is shown in a contracted configuration, where support member 822 is positioned so as not to encumber end effector 310 (in the example, at least partially covering member 820, as indicated by the dashed lines in FIG. 8A). In FIG. 8B, support member 822 is shown in an extended configuration, where support member 822 covers end effector 310 (as indicated by the dashed lines in FIG. 8B). The extended configuration of FIG. 8B is useful as a protective configuration, to protect end effector 310 (a fragile member) from damage during a fall event. The contracted configuration of support member 822 discussed above can also be referred to as a stowed configuration or a compact configuration, as examples. The extended configuration of support member 822 can also be referred to as a support configuration or brace configuration, as examples. FIGS. 8A and 8B illustrate an exemplary implementation where a support member in a protective configuration protects a fragile member by covering said fragile member. FIG. 8B illustrates support member 822 as completely covering end effector 310, but in some implementations support member 822 may only partially cover send effector 310.

Although FIGS. 8A and 8B illustrate support member 822 as protecting end effector 310, support member 822 could protect any fragile member of a robot, as appropriate for a given application. As one example, support member 822 could protect a hand-shaped end effector, such as end effector 510 discussed above with reference to FIGS. 5A, 5B, and 5C. As another example, support member 822 could be positioned to protect a head member, such as head 111 discussed with reference to FIG. 1 above. The stated examples are non-limiting, and a support member such as support member 822 could be positioned to protect any appropriate fragile member as appropriate for a given application.

Figure 9A:
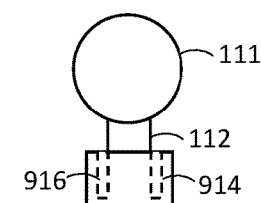
FIGS. 9A and 9B are side views of an exemplary head, neck, torso and corresponding support members of a robot.
Figure 9B:
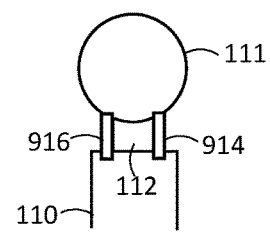

FIGS. 9A and 9B are side-views of torso 110, head 111, and neck 112 as discussed with reference to robot 100 in FIG. 1. In the example, neck 112 is a fragile member, which can include for example complex mechanical structures or data pathways. Torso 110 has at least support members 914 and 916 coupled thereto. In FIG. 9A, support members 914 and 916 are shown in contracted configurations, where support members 914 and 916 are positioned so as not to encumber neck 112. In FIG. 9B, support members 914 and 916 are shown in extended configurations, where support members 914 and 916 brace neck 112 to prevent unwanted movement. The extended configurations of FIG. 9B are useful as a protective configuration, to protect neck 112 (a fragile member) from damage during a fall event. For example, if the robot were to fall and impact head 111 against an object, this could result in strong forces being applied to neck 112; support members 914 and 916 reinforce neck 112 against such forces and thereby protect neck 112 from damage during the fall event. The contracted configurations of support members 914 and 916 discussed above can also be referred to as stowed configurations or compact configurations, as examples. The extended configurations of support members 914 and 916 can also be referred to as support configurations or brace configurations, as examples. FIGS. 9A and 9B illustrate an exemplary implementation where a support member in a protective configuration protects a fragile member by providing structural reinforcement to said fragile member, without necessarily covering said fragile member.

Although FIGS. 9A and 9B illustrate support members 914 and 916 as protecting neck 112, support members 914 and 916 (or more or fewer support members) could protect any fragile member of a robot, as appropriate for a given application. As one example, a support member could protect an end effector, such as end effectors 310 or 510 discussed above with reference to FIG. 3A, 3B, 3C, 5A, 5B, or 5C, by extending to brace said end effector. In particular, a support member could extend along a wrist-joint of an end effector to reinforce the wrist joint, without necessarily covering the entire wrist joint. The stated examples are non-limiting, and support members such as support members 914 and 916 could be positioned to protect any appropriate fragile member as appropriate for a given application.

FIGS. 10A, 10B, 10C, 10D, and 10E illustrate examples of actuating at least one actuatable member to protect at least one fragile member, with reference to robot 100 described with reference to FIG. 1. Unless context dictates otherwise, discussion of FIG. 1 is applicable to FIGS. 10A, 10B, 10C, 10D, and 10E. Not all components labelled in FIG. 1 are labelled in FIGS. 10A, 10B, 10C, 10D, and 10E to avoid clutter.

Figure 10A:
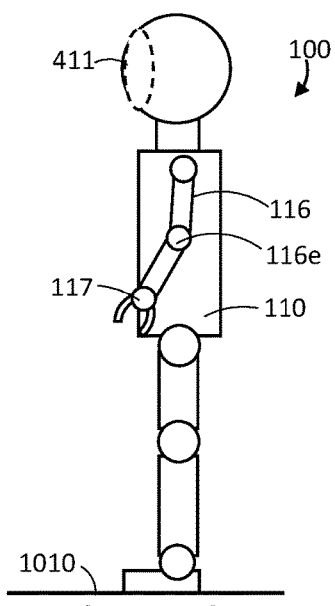
FIGS. 10A, 10B, and 10C are side views of a robot which experiences a fall event.

FIG. 10A is a side view of robot 100. Robot 100 as illustrated includes arm member 116, which includes elbow portion 116e (which is an actuatable joint). Arm member 116 is actuatably coupled to torso 110 at one end, and to end effector 117 at another end. FIG. 10A also shows robot 100 as including face 411 as described above with reference to FIGS. 4A and 4B. In FIG. 10A, robot 100 is standing on surface 1010.

Figure 10B:
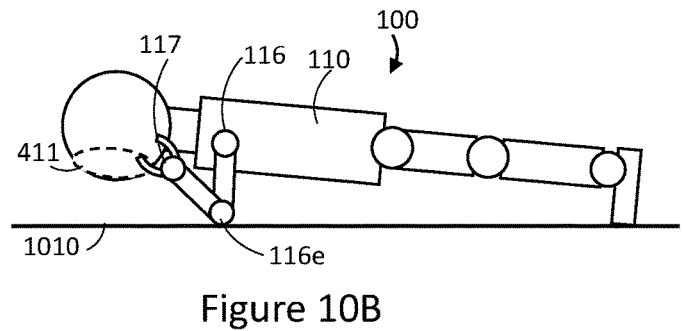

FIG. 10B is a side view of robot 100 after or during a fall event. In response to detecting the fall event (as in act 202 of method 200 discussed above with reference to FIG. 2 and other Figures), arm member 116 is actuated to a protective configuration which protects at least one fragile member of robot 100 during the fall event. In the example of FIG. 10B, elbow portion 116e of arm member 116 is actuated to extend away from torso 110. In this way, elbow portion 116e contacts surface 1010 instead of end effector 117 or face 411. An elbow joint (such as elbow portion 116e) can be made of more material (e.g. made thicker), or can be made simpler, or can be made more cheaply, compared to end-effector components (e.g. fingers or sensor pads) or face components (e.g. actuatable facial features, delicate masks). Consequently, damage to elbow portion 116e can be less problematic than damage to end effector 117 and face 411. In some implementations, support structures can be installed to protect the protective actuatable member (arm member 116 and elbow portion 116e in the illustrated example), as discussed in more detail later with reference to FIGS. 11A, 11B, 12A, 12B, 13A, and 13C.

FIG. 10B illustrates that an actuatable member which is actuated to a protective configuration does not have to be a dedicated protective member. That is, outside of fall events, arm member 116 serves the purpose of moving end effector 117, to better enable robot 100 to interact with the world. During a fall event, arm member 116 acts a protective member (i.e. an actuatable member which is actuated to a protective configuration). Utilizing members for multiple purposes like this advantageously can reduce bulk and weight of a robot compared to using dedicated protective members.

In addition to actuating an actuatable member to a protective configuration, a fragile member can be actuated to a defensive configuration to protect the fragile member. That is, compound actuation can occur to provide better protection. In the example of FIG. 10B, arm member 116 is extended away from torso 110 to a protective configuration as discussed above, and end effector 117 is actuated to a defensive configuration. In particular, end effector 117 is actuated to a defensive configuration, which in the illustrated example includes actuating end effector 117 to a contracted configuration where end effector 117 is moved inwards towards the body of robot 100 (towards torso 110). The illustrated defensive configuration is merely one exemplary defensive configuration, and any other defensive configuration could be utilized as appropriate for a given application. As examples, any the defensive configurations discussed with reference to FIGS. 3A, 3B, 3C, 4A, 4B, 5A, 5B, and 5C could be implemented. Further, any appropriate combination of defensive configurations could be implemented together. As an example, end effector 117 can be actuated to a contracted configuration towards the body of robot 100, the end effector 117 can be actuated to a closed configuration (such as in FIG. 3B, 5B, or 5C), and end effector 117 can be actuated to contract into a support member (such as in FIG. 3C). This combination is merely exemplary, and any other appropriate combination of defensive configurations could be implemented.

Figure 10C:
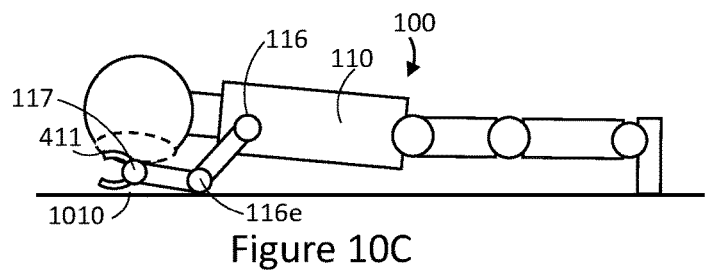

FIG. 10C is a side view of robot 100 after or during a fall event, which is similar to FIG. 10B. Unless context dictates otherwise, discussion of FIG. 10B is applicable to FIG. 10C.

One difference between FIG. 10C and FIG. 10B is that in FIG. 10C, end effector 117 is not actuated to a defensive configuration to protect itself. That is, in FIG. 10C, end effector 117 is not actuated to a contracted configuration where end effector 117 is moved towards the body of robot 100. This may result in undesired damage to end effector 117, but may bring other advantages. In the example of FIG. 10C, end effector 117 is positioned in a protective configuration, in front of face 411, to protect face 411 from damage during the fall event. This could be useful if for example face 411 is more fragile or more valuable than end effector 117, and thus is more important to protect than end effector 117. In some implementations, during a fall event, act 202 of method 200 in FIG. 2 may include not only detecting a fall event, but characterizing, by at least one processor of the robot, the fall event. For example, the at least one processor could detect a direction of fall of the robot, and predict objects with which robot 100 may collide during the fall event, and which members of robot 100 may collide with such objects. Act 204 of method 200 in FIG. 2 could then include and actuating at least one actuatable member of the robot 100 in an optimal manner which minimizes or eliminates damage to at least one fragile member of the robot 100. With reference to the example of FIG. 10C, the at least one processor 132 of robot 100 may determine that face 411 is likely to take significant damage during the fall event, whereas end effector 117 may be unlikely to take damage during the fall event. In such a scenario, end effector 117 can be actuated to a protective configuration which protects face 411, as shown in FIG. 10C. Analysis of damage to members can be performed based on an expected position of such members if they are actuated. In the example of FIG. 10C, the at least one processor 132 can determine the likelihood or extent of damage which end effector is likely to suffer during the fall event if end effector 117 is actuated to the position shown in FIG. 10C.

Figure 10D:
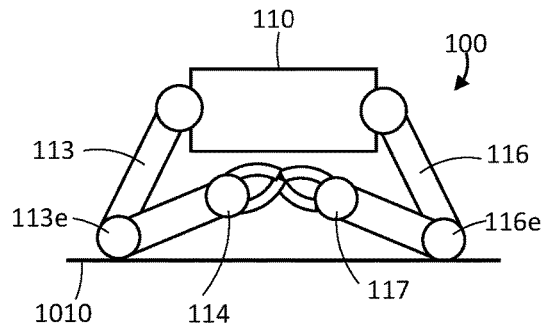
FIGS. 10D and 10E are top views of a robot which experiences a fall event.
Figure 10E:
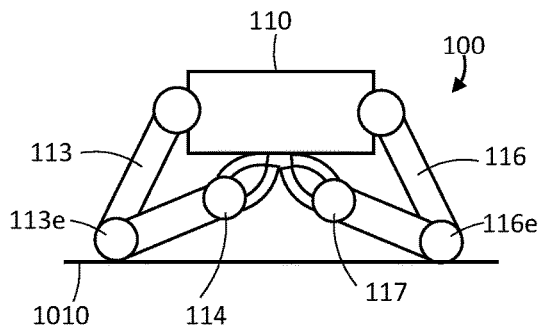

FIGS. 10D and 10E are partial top views of robot 100 (top with reference to the upright orientation of robot 100 shown in FIG. 1), after or during a fall event. Head 111 is not illustrated in FIGS. 10D and 10E to reduce clutter. FIGS. 10D and 10E are similar to FIGS. 10B and 10C, and discussion of FIGS. 10B and 10C is applicable to FIGS. 10D and 10E unless context dictates otherwise. One difference between FIGS. 10D and 10E, compared to FIGS. 10B and 10C, is that FIGS. 10D and 10E illustrate two arm members: arm member 113 and arm member 116. Description of arm member 116 with reference to FIGS. 10B and 10C is applicable to FIGS. 10D and 10E. Arm member 113 is similar to arm member 116: arm member 113 includes an elbow portion 113e (a joint), is coupled to torso 110 at a first end, and is coupled to an end effector 114 at a second end opposite the first end. During a fall event, arm member 113 is actuated to a protective configuration, where elbow portion 113e is extended away from torso 110 to protect end effector 114 from damage during the fall event. FIGS. 10D and 10E illustrate that a fragile member of a robot can include a plurality of fragile members (end effector 114 and end effector 117 in the examples of FIGS. 10D and 10E), and the at least one actuatable member can include a plurality of actuatable members (arm member 113 and arm member 116 in the examples of FIGS. 10D and 10E). Actuating the at least one actuatable member to a protective configuration as in act 204 of method 200 in FIG. 2 can thus comprise actuating each member of the plurality of actuatable members to a respective protective configuration which protects a respective fragile member of the plurality of fragile members from damage during the fall event.

It is possible for a single actuatable member of a plurality of actuatable members to be actuated to a protective configuration to protect a single respective fragile member of a plurality of fragile members during a fall event (i.e., actuatable members can protect fragile members as respective pairs). However, this is not strictly required. In some implementations, multiple actuatable members can be actuated to protect fewer fragile members (e.g., in FIG. 10C, arm member 113 as shown in FIGS. 10D and 10E could be actuated similarly to arm member 116 in FIG. 10C, such that both arm members 113 and 116 protect face 411). As another example, fewer actuatable members can be actuated to protect a greater quantity of fragile members (e.g., in FIGS. 7A and 7B, actuatable member 710 can be actuated to protect face 411, arm member 116, and any other fragile members of robot 100).

One difference between FIGS. 10D and 10E is the configuration of end effectors 114 and 117. In the example of FIG. 10D, end effectors 114 and 117 are actuated to respective defensive configurations (closed configurations in the illustrated example, as discussed with reference to FIGS. 3B, 5B, and 5C). In the example of FIG. 10E, end effectors 114 and 117 are actuated to respective compound defensive configurations. In particular, in FIG. 10E end effectors 114 and 117 are actuated to closed configurations, as discussed with reference to FIGS. 3B, 5B, and 5C, and end effectors 114 and 117 are actuated to contracted configurations, where end effectors 114 and 117 are actuated to move towards torso 110. The illustrated defensive configurations are merely exemplary, and any defensive configurations of combinations of defensive configurations could be implemented as appropriate for a given application.

Further, although FIGS. 10A, 10B, 10C, 10D, and 10E illustrate end effectors 114 and 117 as gripper members (as discussed with reference to FIGS. 3A, 3B, and 3C), any appropriate form of end effector could be implemented. For example, end effectors 114 and 117 in FIGS. 10A, 10B, 10C, 10D, and 10E could comprise hand-shaped members, as discussed with reference to FIGS. 5A, 5B, and 5C.

In some implementations, at least one support structure can be coupled to the at least one actuatable member which protects the at least one actuatable member from damage during the fall event. Several examples are illustrated in FIGS. 11A, 11B, 11C, 11D, 11E, and 11F discussed below.

Figure 11A:
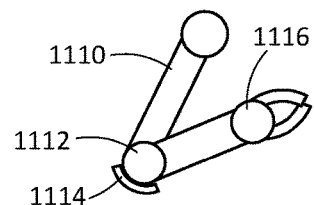
FIGS. 11A and 11B illustrate an actuatable member having support structure to protect the actuatable member during a fall event.
Figure 11B:
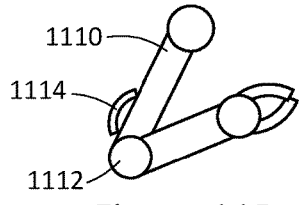

FIGS. 11A and 11B illustrate an exemplary actuatable member 1110 having an end effector 1116 at an end thereof. Actuatable member 1110 includes an elbow portion 1112, such that when actuatable member 1110 is actuated to a protective configuration, elbow support 1112 protects end effector 1116 similar to as discussed above regarding FIGS. 10A, 10B, 10C, 10D, and 10E. Actuatable member 1110 is illustrated as an arm member similar to arm members 113 or 116 discussed above; however, any other form of actuatable member could be implemented as appropriate for a given application.

Because elbow portion 1112 is actuated to a protective configuration in which elbow portion 1112 will receive impact during a fall event, it can be helpful to protect elbow portion 1112 from damage with a support structure. In the example of FIG. 11A, such support structure comprises a pad 1114 (an elbow pad in the illustration) positioned proximate elbow portion 1112, to protect elbow 1112 during a fall event. Pad 1114 could be made of a material which disperses or absorbs impact, reducing the likelihood or severity of damage to elbow portion 1112. For example, pad 1114 could be made of a hard and resilient rubber or other polymer. The support structure (pad 1114) can be coupled to actuatable member 1110, in a support configuration where elbow portion 1112 is supported or protected. In some implementations, this coupling can be static (i.e., the support structure is always in the support configuration).

In other implementations, the support structure can be actuated to the support configuration as needed. In the example of FIG. 11B, the support structure (pad 1114) is positioned in a stowed configuration in which the support structure is stowed. In the example of FIG. 11B, the stowed configuration is shown where pad 1114 is positioned away from elbow portion 1112. Such a stowed configuration can advantageously avoid the support structure encumbering or otherwise limiting movement of elbow portion 1112. In such an implementation, the support structure is actuatable to the support configuration shown in FIG. 11A. In response to detecting the fall event as in act 202 of method 200 in FIG. 2, the at least one support structure is actuated from the stowed configuration of FIG. 11B to the support configuration of FIG. 11A. In the example of FIGS. 11A and 11B, the pad 1114 is actuated to cover the elbow portion 1112. After the robot recovers from the fall event (e.g. stands back up, is helped back up, etcetera), the support structure can be actuated from the support configuration to the stowed configuration.

Figure 12A:
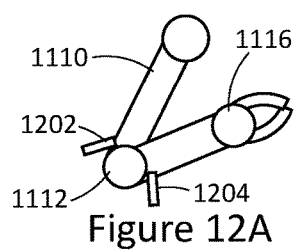
FIGS. 12A and 12B illustrate another actuatable member having support structure to protect the actuatable member during a fall event.
Figure 12B:
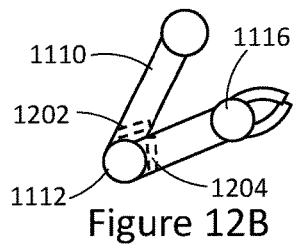

FIGS. 12A and 12B illustrate an exemplary actuatable member 1110 having an end effector 1116 at an end thereof, similar to FIGS. 11A and 11B. Description of FIGS. 11A and 11B is applicable to FIGS. 12A and 12B unless context dictates otherwise. As with FIGS. 11A and 11B, in FIGS. 12A and 12B actuatable member 1110 also includes an elbow portion 1112, such that when actuatable member 1110 is actuated to a protective configuration, elbow portion 1112 protects end effector 1116 similar to as discussed above regarding FIGS. 10A, 10B, 10C, 10D, and 10E. Actuatable member 1110 is illustrated as an arm member similar to arm members 113 or 116 discussed above; however, any other form of actuatable member could be implemented as appropriate for a given application.

One difference between FIGS. 12A and 12B, compared to FIGS. 11A and 11B, is that the support structure which protects elbow portion 1112 is of a different form. In the example of FIG. 12A, such support structure comprises pedestals 1202 and 1204 (alternatively called protrusions) positioned proximate elbow portion 1112, to protect elbow portion 1112 during a fall event. The support structure (pedestals 1202 and 1204) can be coupled to actuatable member 1110, in a support configuration where elbow portion 1112 is supported or protected. For example, pedestals 1202 and 1204 could be coupled to rigid structural elements of actuatable member 1110 (such as skeletal support components, similar to human bones), instead of being coupled to elbow portion 1112 itself. In this way, impact during a fall event is transferred to rigid, robust components of a robot, instead of being imparted on a more fragile joint component. In some implementations, the coupling between pedestals 1202 and 1204 and actuatable member 1110 can be static (i.e., the support structure is always in the support configuration).

In other implementations, the support structure can be actuated to the support configuration as needed. In the example of FIG. 12B, the support structure (pedestals 1202 and 1204) are positioned in a stowed configuration in which the support structure is stowed. In the example of FIG. 12B, the stowed configuration is shown where pedestals 1202 and 1204 are retracted into a housing of the actuatable member 1110 (shown as dashed lines in FIG. 12B). Such a stowed configuration can advantageously avoid the support structure encumbering or otherwise limiting movement of elbow portion 1112, or having an unpleasant appearance. In such an implementation, the support structure is actuatable to the support configuration shown in FIG. 12A. In response to detecting the fall event as in act 202 of method 200 in FIG. 2, the at least one support structure is actuated from the stowed configuration of FIG. 12B to the support configuration of FIG. 12A. In the example of FIGS. 12A and 12B, the pedestals 1202 and 1204 are actuated to extends outwards away from the actuatable member 1110. After the robot recovers from the fall event (e.g. stands back up, is helped back up, etcetera), the support structure can be actuated from the support configuration to the stowed configuration.

Although FIGS. 12A and 12B illustrate a support structure which comprises two pedestals, the support structure could comprise any number of pedestals as appropriate for a given application.

Figure 13A:
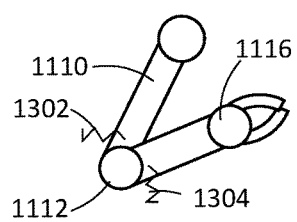
FIGS. 13A and 13B illustrate yet another actuatable member having support structure to protect the actuatable member during a fall event.
Figure 13B:
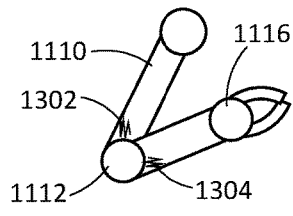

FIGS. 13A and 13B illustrate an exemplary actuatable member 1110 having an end effector 1116 at an end thereof, similar to FIGS. 11A, 11B, 12A, and 12B. Description of FIGS. 11A, 11B, 12A, and 12B is applicable to FIGS. 13A and 13B unless context dictates otherwise. As with FIGS. 11A, 11B, 12A, and 12B, in FIGS. 13A and 13B actuatable member 1110 also includes an elbow portion 1112, such that when actuatable member 1110 is actuated to a protective configuration, elbow portion 1112 protects end effector 1116 similar to as discussed above regarding FIGS. 10A, 10B, 10C, 10D, and 10E. Actuatable member 1110 is illustrated as an arm member similar to arm members 113 or 116 discussed above; however, any other form of actuatable member could be implemented as appropriate for a given application.

Similar to the example of FIGS. 12A and 12B, the support structure of FIGS. 13A and 13B comprises protrusions 1302 and 1304 positioned proximate elbow portion 1112, to protect elbow 1112 during a fall event. In FIGS. 13A and 13B however, protrusions 1302 and 1304 are springs, which can absorb impact or provide cushioning during a fall event. The support structure (springs 1302 and 1304) can be coupled to actuatable member 1110, in a support configuration where elbow portion 1112 is supported or protected. For example, springs 1302 and 1304 could be coupled to rigid structural elements of actuatable member 1110 (such as skeletal support components, similar to human bones), instead of being coupled to elbow portion 1112 itself. In this way, impact during a fall event is transferred to rigid, robust components of a robot, instead of being imparted on a more fragile joint component. Alternatively, springs 1302 and 1304 could be coupled to elbow portion 1112, since springs will absorb impact (reduce momentum over a greater period of time) instead of quickly transferring such impact directly to elbow portion 1112. In some implementations, the coupling between springs 1302 and 1304 and actuatable member 1110 can be static (i.e., the support structure is always in the support configuration).

In other implementations, the support structure can be actuated to the support configuration as needed. In the example of FIG. 13B, the support structure (springs 1302 and 1304) are positioned in a stowed configuration in which the support structure is stowed. In the example of FIG. 13B, the stowed configuration is shown where springs 1302 and 1304 are retracted into a housing of the actuatable member 1110. Such a stowed configuration can advantageously avoid the support structure encumbering or otherwise limiting movement of elbow portion 1112, or having an unpleasant appearance. In such an implementation, the support structure is actuatable to the support configuration shown in FIG. 13A. In response to detecting the fall event as in act 202 of method 200 in FIG. 2, the at least one support structure is actuated from the stowed configuration of FIG. 13B to the support configuration of FIG. 13A. In the example of FIGS. 13A and 13B, the springs 1302 and 1304 are actuated to extends outwards away from the actuatable member 1110. After the robot recovers from the fall event (e.g. stands back up, is helped back up, etcetera), the at least one support member can be actuated from the support configuration to the stowed configuration.

Although FIGS. 13A and 13B illustrate a support structure which comprises two springs, the support structure could comprise any number of springs as appropriate for a given application.

The examples of FIGS. 11A, 11B, 12A, 12B, 13A, and 13B show support structures for supporting elbow joints during a fall event. However, similar support structure could be implemented for any actuatable members, as appropriate for a given application.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A robot comprising:
   a body;
   at least one actuatable member comprising an arm member including an elbow portion;
   a fragile member comprising a hand-shaped end effector coupled to the body by the arm member;
   at least one processor;
   at least one sensor communicatively coupled to the at least one processor;
   at least one non-transitory processor-readable storage medium communicatively coupled to the at least one processor, the at least one non-transitory processor-readable storage medium storing processor-executable instructions which, when executed by the at least one processor, cause the robot to:
detect, by the at least one processor, a fall event of the body based on sensor data from the at least one sensor; and
in response to detecting the fall event;
  actuate the hand-shaped end effector to move towards the body in a defensive configuration which protects the fragile member from damage during the fall event; and
  actuate the arm member to extend the elbow portion away from the body in a protective configuration which protects the fragile member from damage during the fall event.

2. The robot of claim 1, wherein the defensive configuration is a contracted configuration.

3. The robot of claim 1, wherein:
the hand-shaped end effector comprises a plurality of finger-shaped members coupled to a palm-shaped member; and
the defensive configuration is a fist-shaped configuration.

4. The robot of claim 1, wherein;
the processor-executable instructions which, when executed by the at least one processor, cause the robot to actuate the arm member to extend the elbow portion away from the body in a protective configuration cause the elbow portion of the arm member to brace the body during the fall event.

5. The robot of claim 1, wherein:
the arm member comprises at least one support member; and
the processor-executable instructions which, when executed by the at least one processor, cause the robot to actuate the arm member to extend the elbow portion away from the body in a protective configuration cause the support member to extend from a stowed configuration to a support configuration which braces the fragile member during the fall event.

6. The robot of claim 1, wherein:
the fragile member includes a plurality of fragile members;
the at least one actuatable member includes a plurality of actuatable members; and
the processor-executable instructions-which, when executed by the at least one processor, further cause the robot to: actuate each actuatable member of the plurality of actuatable members to a respective protective configuration which protects a respective fragile member of the plurality of fragile members from damage during the fall event.

7. The robot of claim 1, wherein the defensive configuration is a contracted configuration, and the protective configuration is an extended configuration.

8. The robot of claim 1, wherein:
the hand-shaped member includes two hand-shaped members; and
the at least one arm member includes two arm members.

9. The robot of claim 1, further comprising at least one support structure coupled to the at least one actuatable member which protects the at least one actuatable member from damage during the fall event.

10. The robot of claim 9, wherein the at least one support structure is selected from a group of structures consisting of:
at least one pad;
at least one pedestal; and
at least one spring.

11. The robot of claim 9, wherein;
the at least one support structure comprises at least one elbow pad positioned at or proximate the elbow portion.

12. The robot of claim 11, wherein the processor-executable instructions, when executed by the at least one processor, further cause the robot to, in response to detecting the fall event:
actuate the elbow pad to cover the elbow portion.

13. The robot of claim 9, wherein:
the support structure is actuatable between a stowed configuration in which the support structure is stowed, and a support configuration in which the support structure supports the at least one actuatable member; and
the processor-executable instructions, when executed by the at least one processor, further cause the robot to, in response to detecting the fall event, actuate the at least one support structure from the stowed configuration to the support configuration.

14. The robot of claim 1, wherein the at least one sensor comprises at least one sensor selected from a group of sensors consisting of:
an accelerometer;
a gyroscope;
an inertial measurement unit;
a visual sensor;
a LIDAR sensor;
an audio sensor; and
a tactile sensor.

15. The robot of claim 1, further comprising two actuatable leg members, wherein the two actuatable leg members are actuatable to move the robot by bipedal motion.

* * * * *